United States Patent [19]

Hyun

[11] Patent Number: 5,715,570
[45] Date of Patent: Feb. 10, 1998

[54] COOKING APPLIANCE HANDLE

[76] Inventor: Kawn Man Hyun, 6-303, Siyung Apt., 80-14, Dadai 2-Dong, Saha-gu, Pusan-city, Rep. of Korea

[21] Appl. No.: 602,588

[22] Filed: Feb. 16, 1996

[30] Foreign Application Priority Data

Feb. 20, 1995 [KR] Rep. of Korea ............... 95-2986

[51] Int. Cl.$^6$ ................................. A47B 95/02
[52] U.S. Cl. ............... 16/110 A; 248/37.6; 220/735
[58] Field of Search ............... 16/111 A, 111 R, 16/110 R; 220/755, 735, 744, 756, 697; 294/27.1, 28; 248/37.6, 37.3, 110, 111, 112

[56] References Cited

U.S. PATENT DOCUMENTS 5,518,211  5/1996  Gaskill et al. ............... 220/735

FOREIGN PATENT DOCUMENTS 406217879  8/1994  Japan ............... 220/735

*Primary Examiner*—Chuck Y. Mah
*Assistant Examiner*—Mark Williams
*Attorney, Agent, or Firm*—Leydig, Voit & Mayer, Ltd.

[57] ABSTRACT

A cooking appliance handle has a supporting member pivotally mounted on a recess formed at a gripping handle, so that a supplementary utensil is supported on the supporting member to prevent cooking oil of the supplementary appliance being stuck to a board of a stove or kitchen counter top or a foreign substance being stuck to the supplementary appliance.

2 Claims, 2 Drawing Sheets

COOKING APPLIANCE HANDLE

BACKGROUND OF THE INVENTION

This invention relates to a cooking appliance, such as a frying pan and, more particularly, to a cooking appliance handle having a member for supporting a supplementary appliance or utensil.

Typically, a cooking appliance, such as a frying pan, is provided with a gripping handle. When cooking with the frying pan, a supplementary utensil or other appliance, such as a spatula or scoop, is used for turning food such as pancakes or eggs. During cooking, the spatula is typically placed on top of the stove or on the kitchen counter top and thus, a foreign substance such as food stuck to the spatula and/or cooking oil is dropped thereon.

SUMMARY OF THE INVENTION

Accordingly, it is an object of the present invention to provide a cooking appliance handle having a supporting member on which a supplemental utensil is placed during cooking to overcome the drawbacks of the prior cooking appliance.

According to the invention, there is provided a cooking appliance handle comprising a gripping handle which may be attached to an appliance body and a pivotal supporting member hinged to the gripping handle for supporting a supplementary utensil.

The above and other objects, features and advantages of the present invention will become apparent from the following description and the appended claims, taken in conjunction with the accompanying drawings.

DETAILED DESCRIPTION OF THE PREFERRED EMBODIMENT

Figure 1:
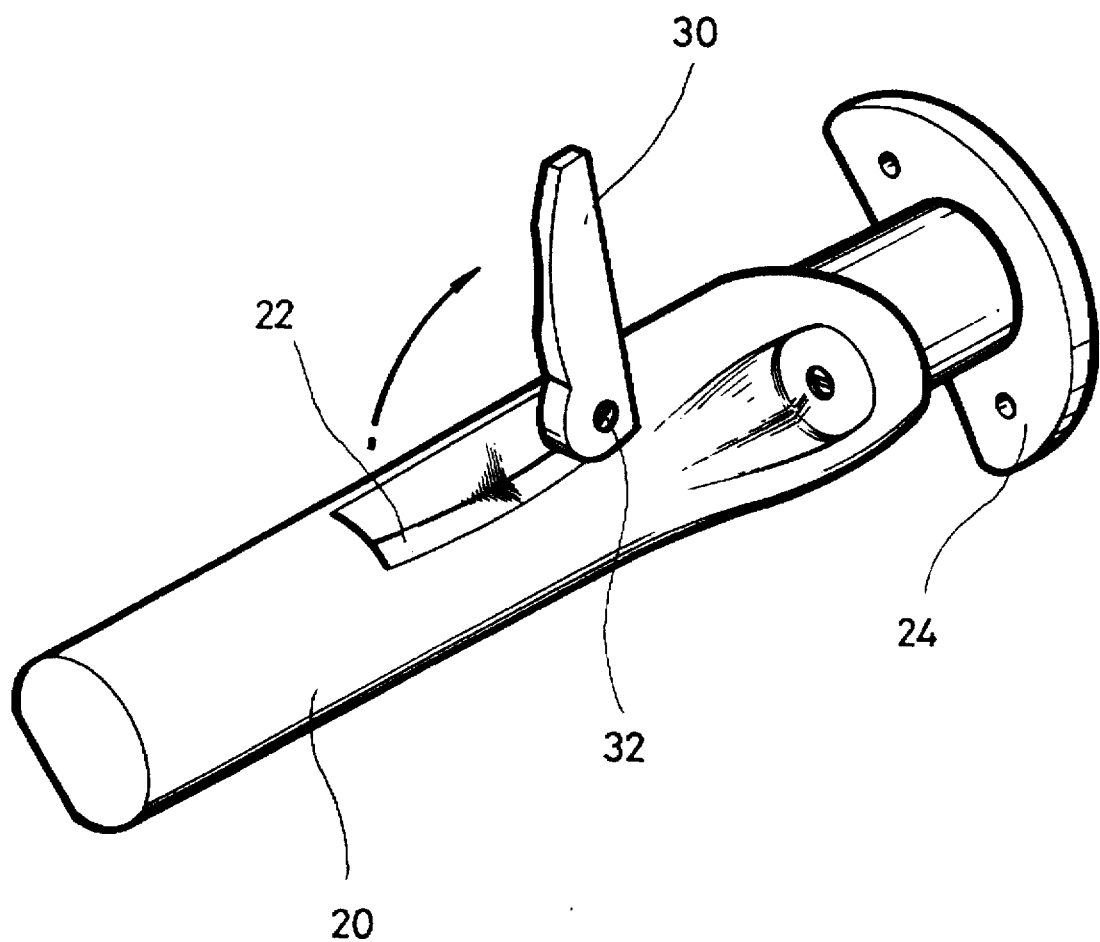
FIG. 1 is a perspective view of a cooking appliance handle according to the present invention.
Figure 2:
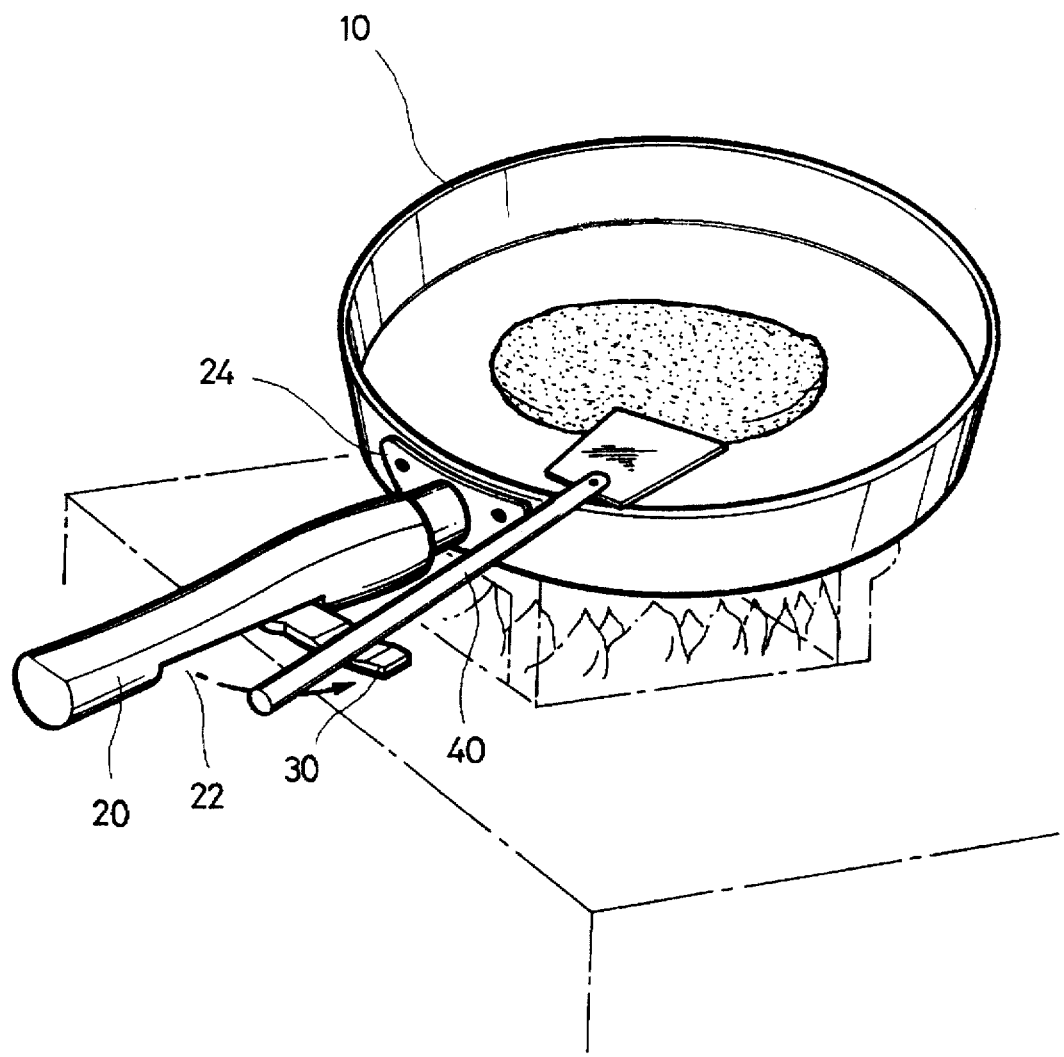
FIG. 2 is a perspective view of a frying pan having a gripping handle according to the present invention.

Referring to FIGS. 1 and 2, there is shown a frying pan handle 20 in accordance with the present invention. The frying pan includes a cooking plate 10 and a gripping handle 20 having a coupling member 24 at an end thereof for attaching to the cooking plate 10. A recess 22 is formed in the gripping handle 20, in which a supporting member 30 is pivotally mounted with a hinge 32. An outer surface of the supporting member 30 has the same contour as the gripping handle 20. During cooking with the frying pan, a user can pivot the supporting member to make a substantially right angle with the gripping handle 20 and position the handle of a spatula 40 on the inner side of the supporting member 30 with a plate portion of the spatula supported on the top of the side wall of the cooking plate 10.

Accordingly, there is no need to worry that a foreign substance is stuck, or cooking oil is dropped on the stove top or kitchen counter top.

What is claimed is:

1. A pan comprising a gripping handle attached to the exterior of the pan, and a supporting member for supporting a cooking utensil on the upper surface thereof, the supporting member having one end rotatably fastened to the gripping handle such that the supporting member can be moved between a used position extending outwardly from the handle and a non-used position substantially parallel to the handle.

2. A pan as claimed in claim 1, wherein a recess is formed in the gripping handle to receive the supporting member while it is in the non-used position.

* * * * *